United States Patent
Asami et al.

(10) Patent No.: US 7,889,331 B2
(45) Date of Patent: Feb. 15, 2011

(54) BIDIRECTIONAL OPTICAL MODULE AND OPTICAL TIME DOMAIN REFLECTOMETER EQUIPPED WITH THE BIDIRECTIONAL OPTICAL MODULE

(75) Inventors: Keisuke Asami, Musashino (JP); Katsushi Oota, Musashino (JP); Haruo Shibuya, Musashino (JP); Yasuhiko Muramatsu, Musashino (JP); Shunji Sakai, Saitama (JP)

(73) Assignees: Yokogawa Electric Corporation, Tokyo (JP); Optohub Co., Ltd, Saitama (JP)

( * ) Notice: Subject to any disclaimer, the term of this patent is extended or adjusted under 35 U.S.C. 154(b) by 345 days.

(21) Appl. No.: 11/843,963

(22) Filed: Aug. 23, 2007

(65) Prior Publication Data
US 2008/0055589 A1    Mar. 6, 2008

(30) Foreign Application Priority Data
Aug. 25, 2006 (JP) ............................... 2006-229264

(51) Int. Cl.
G01N 21/00 (2006.01)
H04B 10/08 (2006.01)
H04B 17/00 (2006.01)
H04B 10/00 (2006.01)

(52) U.S. Cl. ............................ 356/73.1; 398/13; 398/20; 398/21; 398/135; 398/138; 398/139; 398/140

(58) Field of Classification Search .................. None
See application file for complete search history.

(56) References Cited

U.S. PATENT DOCUMENTS

| | | | | |
|---|---|---|---|---|
| 4,904,864 A | * | 2/1990 | Dakin et al. | 250/227.18 |
| 5,534,994 A | * | 7/1996 | Hanson et al. | 356/73.1 |
| 6,229,599 B1 | * | 5/2001 | Galtarossa | 356/73.1 |
| 6,546,171 B2 | * | 4/2003 | Fukutomi | 385/49 |
| 6,908,235 B2 | * | 6/2005 | Kuhara | 385/88 |
| 7,093,988 B2 | * | 8/2006 | Tsumori | 385/93 |
| 7,110,098 B2 | * | 9/2006 | Peerlings | 356/73.1 |
| 2001/0033716 A1 | * | 10/2001 | Fukutomi | 385/49 |
| 2005/0157988 A1 | * | 7/2005 | Lo et al. | 385/92 |
| 2007/0297813 A1 | * | 12/2007 | Urata et al. | 398/212 |
| 2009/0238570 A1 | * | 9/2009 | Grier | 398/82 |

FOREIGN PATENT DOCUMENTS

| | | |
|---|---|---|
| JP | 4-296812 A | 10/1992 |
| JP | 8-166526 A | 6/1996 |
| JP | 10-336106 A | 12/1998 |
| JP | 2001-305017 A | 10/2001 |

\* cited by examiner

*Primary Examiner*—Gregory J Toatley
*Assistant Examiner*—Gordon J Stock, Jr.
(74) *Attorney, Agent, or Firm*—Sughrue Mion, PLLC

(57) ABSTRACT

A bidirectional optical module according to the present invention comprises light emitting elements 110, 130 that emit light to enter an optical fiber 71, a light receiving element 190 that receives light having exited the optical fiber 71 and a light branching element 160 that guides the light having exited the optical fiber 71 onto the light receiving element 190. It further includes a stray light shielding member 185 disposed between the light branching element 160 and the light receiving element 190 and having formed therein an opening 186, through which the light to enter the light receiving element 190 passes. The stray light shielding member 185 blocks stray light 100b while light 100a having exited the fiber 71 passes through the opening 186. Therefore, any increase in the extent of error in the detection of the returning light level or the position of a reflecting point is prevented.

18 Claims, 10 Drawing Sheets

BIDIRECTIONAL OPTICAL MODULE AND OPTICAL TIME DOMAIN REFLECTOMETER EQUIPPED WITH THE BIDIRECTIONAL OPTICAL MODULE

CROSS REFERENCE TO RELATED APPLICATION

The disclosure of Japanese Patent Application No. JP 2006-229264 filed on Aug. 25, 2006 is incorporated herein by reference in its entirety.

BACKGROUND OF THE INVENTION

1. Field of the Invention

The present invention relates to a bidirectional optical module and more specifically, it relates to a bidirectional optical module to be included in an OTDR used in applications such as measurement of a fracture in an optical fiber communication network.

2. Description of the Related Art

A measuring device such as an optical fiber sensor, which executes measurement by using light in an optical communication system or the like, includes a light source that emits light and a light receiving unit that receives the light. A measuring device utilized in maintenance, management and the like of an optical communication system includes a light source that emits measurement light to be used for purposes of measurement to a measurement target optical fiber and a light receiving unit that receives light transmitted through the measurement target optical fiber.

For instance, an OTDR (Optical Time Domain Reflectometer) may be utilized in the installation, maintenance and the like of an optical fiber in order to monitor the state of the optical fiber through which light signals are transmitted for data communication in an optical communication system. An OTDR executes measurement to determine the conditions of the measurement target optical fiber, e.g., whether or not a disconnection has occurred at the measurement target optical fiber, the extent of loss or the like, by repeatedly inputting pulse light to the measurement target optical fiber and measuring the level of light reflected from the measurement target optical fiber, the level of light scattered to the rear and the length of time over which the light is received.

An OTDR includes a bidirectional optical module, a BIDI (bidirectional) module or the like, having a transmission unit and a reception unit housed in a single case. The advent of the FTTH (fiber to the home) technologies in recent years has resulted in these modules being offered at more affordable prices and thus, they have come to be used in a wide range of applications including other types of measuring devices and optical communication systems as well as OTDRs.

Patent reference literature 1 and patent reference literature 2 each disclose a structure that may be adopted in an OTDR equipped with a bidirectional optical module. The OTDR shown in FIG. 7, for instance, includes a bidirectional optical module 10, an LD drive unit 20, a sampling unit 30, a signal processing unit 40 and a display unit 50.

The bidirectional optical module 10 outputs pulse light to a measurement target optical fiber 73 via a measurement connector 60 and receives the light returning from the measurement target optical fiber 73. The LD drive unit 20 drives a light source disposed within the bidirectional optical module 10. The sampling unit 30 is a functional unit that converts an electrical signal (photocurrent) from a light receiving unit within the bidirectional optical module 10 to a voltage and samples the voltage resulting from the conversion. The signal processing unit 40 is a functional unit that engages the bidirectional optical module 10 to output pulse light via the LD drive unit 20 and engages the sampling unit 30 in a sampling operation. In addition, the signal processing unit 40 executes arithmetic operation processing on the electrical signal sampled by the sampling unit 30. The display unit 50 is a functional unit that indicates the signal processing results and may be constituted with, for instance, a display device.

As shown in FIG. 8, for instance, the bidirectional optical module 10 in the related art includes light emitting elements 11 and 13 that emit light, lenses 12 and 14 from which light is output as parallel light, a wave integrating element 15 that integrates a plurality of light fluxes into a single light flux, lenses 17 and 18 that condense light, a light branching element 16 that branches light and a light receiving element 19 that receives light (see patent reference literatures 1 through 3).

The light emitting elements 11 and 13 in the bidirectional optical module 10 may respectively emit light with a wavelength $\lambda 1$ and light with a wavelength $\lambda 2$. The light fluxes with the wavelengths $\lambda 1$ and $\lambda 2$ emitted from the light emitting elements 11 and 13 become parallel light fluxes through the lenses 12 and 14 respectively and these parallel light fluxes are then integrated at the wave integrating element 15. The light having become integrated at the wave integrating element 15 is then condensed via the lens 17, enters an optical fiber 71 and subsequently enters the measurement target optical fiber 73 connected to the optical fiber 71 via the measurement connector 60.

The light having entered the measurement target optical fiber 73 is reflected at a fracture or a connecting point in the measurement target optical fiber 73 and the returning light travels back through the measurement target optical fiber 73 to enter the bidirectional optical module 10 via the optical fiber 71 connected to the measurement target optical fiber 73 through the measurement connector 60. The returning light becomes parallel light at the lens 17 and then part of or all of the returning light is guided to the light receiving element 19 via the light branching element 16. The light reflected toward the light receiving element 19 via the light branching element 16 is condensed through the lens 18 before entering the light receiving element 19.

As an alternative, optical fiber couplers may be used to constitute a bidirectional optical module as shown in FIG. 9 (see, for instance, patent reference literature 4). An optical fiber coupler-type bidirectional optical module 10' includes light emitting elements 11' and 13', a wave integrating optical coupler 15', a light branching coupler 16' and a light receiving element 19'. Light fluxes emitted from the two light emitting elements 11' and 13' enter the wave integrating optical coupler 15' where they become integrated with each other. The integrated light then enters the measurement target optical fiber 73 connected through the measurement connector 60 via the light branching coupler 16'.

The light having entered the measurement target optical fiber 73 is reflected at a fracture or a connecting point inside the measurement target optical fiber 73 and the returning light travels back through the measurement target optical fiber 73 to enter the bidirectional optical module 10. The returning light is branched at the light branching coupler 16' before it enters the light receiving element 19'. It is to be noted that one of the output ends, i.e. an output end a, the wave integrating optical coupler 15' and one of the output ends, i.e., an output end b, of the light branching coupler 16' are both treated so that no light is reflected at these ends.

Patent reference literature 1: Japanese Laid Open Patent Publication No. 2001-305017

Patent reference literature 2: Japanese Laid Open Patent Publication No. H4-296812

Patent reference literature 3: Japanese Laid Open Patent Publication No. H8-166526

Patent reference literature 4: Japanese Laid Open Patent Publication No. H10-336106

However, a phenomenon whereby stray light having been reflected or scattered from the surfaces of optical parts or other components such as metal cases, is repeatedly attenuated, tends to occur readily in the bidirectional optical module 10 in the related art adopting the structure shown in FIG. 10. The explanation is given here by assuming that a light receiving surface 19c of the light receiving element 19 includes a first light receiving area 19a located at the center of the light receiving surface 19c and a second light receiving area 19b ranging around the first light receiving area 19a and that better frequency characteristics are achieved over the first light receiving area 19a than over the second light receiving area 19b. While returning light 10a enters the first light receiving area 19a of the light receiving element 19, most of the stray light 10b enters the lens 18 at an angle different from that of the light 10a, as shown in FIG. 10. In this situation, the stray light 10b is condensed onto the second light receiving area 19b via the lens 18.

By measuring a fracture or a connecting point within the measurement target optical fiber 73 with the OTDR 1 equipped with the bidirectional optical module 10, a waveform such as that shown in FIG. 11 is detected. When a fracture or a connecting point is detected via the OTDR 1, the returning light registers a higher signal level, which manifests as a markedly protruding point such as point A in FIG. 11 in the waveform (a Fresnel reflection waveform). The stray light 10b received at the light receiving element 19 under such circumstances is bound to increase the extent of error in detecting the returning light level or the reflecting point position.

In particular, if a great deal of stray light 10b is received in the second light receiving area 19b, a problem arises in that the skirt range (skirt shaped range), also referred to as an attenuation dead zone, in the waveform representing the results of the measurement of light reflected at a fracture or a connecting point in the measurement target optical fiber 73 becomes greater. There are two types of stray light 10b, i.e., some of the light emitted from the light emitting elements 11 and 13 eventually ends up as stray light and some of the light returning from the measurement target optical fiber 73 also eventually ends up as stray light. The first type of stray light, which is received at the light receiving element 19 sooner than the returning light from the measurement target optical fiber 73, poses difficulty mainly when a reflecting point closer to the device needs to be detected. The second type of stray light is problematic in that with the stray light component added to the true returning light level, an error occurs in the detection of the returning light level and that the increased skirt range makes it more difficult to distinguish two reflecting points close to each other, which, in turn, makes it more difficult to identify loss.

An optical fiber in the optical fiber coupler-type bidirectional optical module 10' constitutes a very narrow wave guiding passage and thus, returning light fluxes, intentionally coupled through a lens, are guided as integrated light. However, the optical fiber acts as a pinhole for stray light scattered at an angle different from the angle of the returning light, restricting the advance of the stray light. In other words, the structure of the optical fiber coupler-type bidirectional optical module 10' does not allow redundant reflected light in the optical system or scattered stray light to enter the light receiving element 19' readily. For this reason, while the skirt range in the waveform indicating the results of the measurement of light reflected at a fracture inside the measurement target optical fiber 73 executed by utilizing the optical fiber coupler-type bidirectional optical module 10' remains small, the cost of the components of the optical fiber coupler-type bidirectional optical module 10' is bound to be significant. In addition, since the form of the fiber is determined based upon the minimum flexural radius of the optical fiber, the module cannot be provided as a compact unit.

SUMMARY OF THE INVENTION

An object of the present invention, having been completed by addressing the issues discussed above, is to provide a new and improved bidirectional optical module offered as a compact unit assuring a high level of dimensional accuracy and an OTDR that includes this bidirectional optical module.

The object described above is achieved in an aspect of the present invention by providing a bidirectional optical module comprising a single light emitting element that emits light to enter an optical fiber or a plurality of such light emitting elements, a light receiving element that receives light having exited the optical fiber and a light branching element that guides the light having exited the optical fiber to the light receiving element, with a stray light shielding member having an opening formed therein, through which light to enter the light receiving element passes, disposed between the light branching element and the light receiving element.

In addition to the light having exited the optical fiber, stray light having been reflected or scattered within the bidirectional optical module may enter the light receiving surface of the light receiving element. Such stray light may become a direct cause of an increase in the extent of error in detecting the returning light level or a reflecting point position. Accordingly, the present invention discloses a structure that includes a stray light shielding member so as to block the stray light. At the same time, the light having exited the optical fiber passes through the opening formed at the stray light shielding member and is guided onto the light receiving surface of the light receiving element. As a result, a bidirectional optical module assuring improved measurement accuracy by preventing an increase in the extent of error in detecting the returning light level or the reflecting point position is provided.

The light receiving surface of the light receiving element includes a first light receiving area and a second light receiving area with lower frequency characteristics compared to the first light receiving area. Accordingly, the bidirectional optical module may further comprise a first light condensing element that condenses the light having passed through the opening onto the first light receiving area, disposed between the stray light shielding member and the light receiving element. The light having passed through the opening can be condensed onto the first light receiving area with the superior frequency characteristics with a high level of reliability in the bidirectional optical module equipped with such a light condensing element.

The opening has an area equal to or less than the areal range of the first light receiving area at the light receiving element. While the frequency characteristics may vary at different positions assumed on the light receiving surface, highly accurate detection is enabled by ensuring that the light is received at a position where superior frequency characteristics are assured. Accordingly, in order to ensure that the light having passed through the opening is easily detected at the first light receiving area with the better frequency characteristics at the light receiving surface of the light receiving element, the opening area is set smaller than the areal range of the first light receiving area at the light receiving element.

The bidirectional optical module may further include a second light condensing element that condenses light having become branched via the light branching element onto the opening at the stray light shielding member, disposed between the light branching element and the stray light shielding member. As the light having been condensed via the second light condensing element becomes shielded at the small opening equivalent to a light condensing point, the opening is allowed to function as a light emitting point. As a result, the light can be coupled on the first light receiving area with a high level of reliability via the first light condensing element disposed between the stray light shielding member and the light receiving element.

In addition, the stray light shielding member may be disposed so as to cover the second light receiving area. No light can be received in the second light receiving area with poorer frequency characteristics, as long as it is covered by the stray light shielding member. The stray light shielding member can be integrated into the light receiving element by, for instance, layering a reflecting film for reflecting light over the second light receiving area or by bonding a reflecting member so as to cover the second light receiving area.

The light receiving element in the bidirectional optical module described above may be engaged in detection of the loss characteristics of the optical fiber by receiving light returning from the optical fiber having received the light originating from the light emitting element or in detection of information exchanged with an external device through communication by receiving light from an optical fiber having received light emitted from the external device.

The object described earlier is also achieved in another aspect of the present invention by providing an optical time domain reflectometer used to test the loss characteristics of an optical fiber. The optical time domain reflectometer comprises a bidirectional optical module that emits light toward the optical fiber and receives light returning from the optical fiber, a bidirectional optical module drive unit that drives the bidirectional optical module so as to emit light with predetermined timing, an electrical signal conversion unit that converts light having entered the bidirectional optical module to an electrical signal and a signal processing unit that determines through calculation the loss characteristics of the optical fiber based upon the electrical signal resulting from the conversion executed by the electrical signal conversion unit. The bidirectional optical module in the optical time domain reflectometer comprises a single light emitting element that emits light to enter the optical fiber or a plurality of such light emitting elements, a light receiving element that receives light having exited the optical fiber and a light branching element that guides the light having exited the optical fiber to the light receiving element, with a stray light shielding member having an opening formed therein, through which light to enter the light receiving element passes, disposed between the light branching element and the light receiving element.

In addition to the light having exited the optical fiber, stray light having been reflected or scattered within the bidirectional optical module may enter the light receiving surface of the light receiving element of the bidirectional optical module in the optical time domain reflectometer according to the present invention. Such stray light may become a direct cause of an increase in the extent of error in detecting the returning light level or a reflecting point position. Accordingly, the present invention discloses a structure that includes a stray light shielding member so as to block the stray light. At the same time, the light having exited the optical fiber passes through the opening formed at the stray light shielding member and is guided onto the light receiving surface of the light receiving element. As a result, an optical time domain reflectometer assuring improved measurement accuracy by preventing an increase in the extent of error in detecting the returning light level or the reflecting point position is provided.

According to the present invention, a compact bidirectional optical module assuring high measurement accuracy and an optical time domain reflectometer equipped with the bidirectional optical module are provided.

DETAILED DESCRIPTION OF THE PREFERRED EMBODIMENTS

Figure 1:
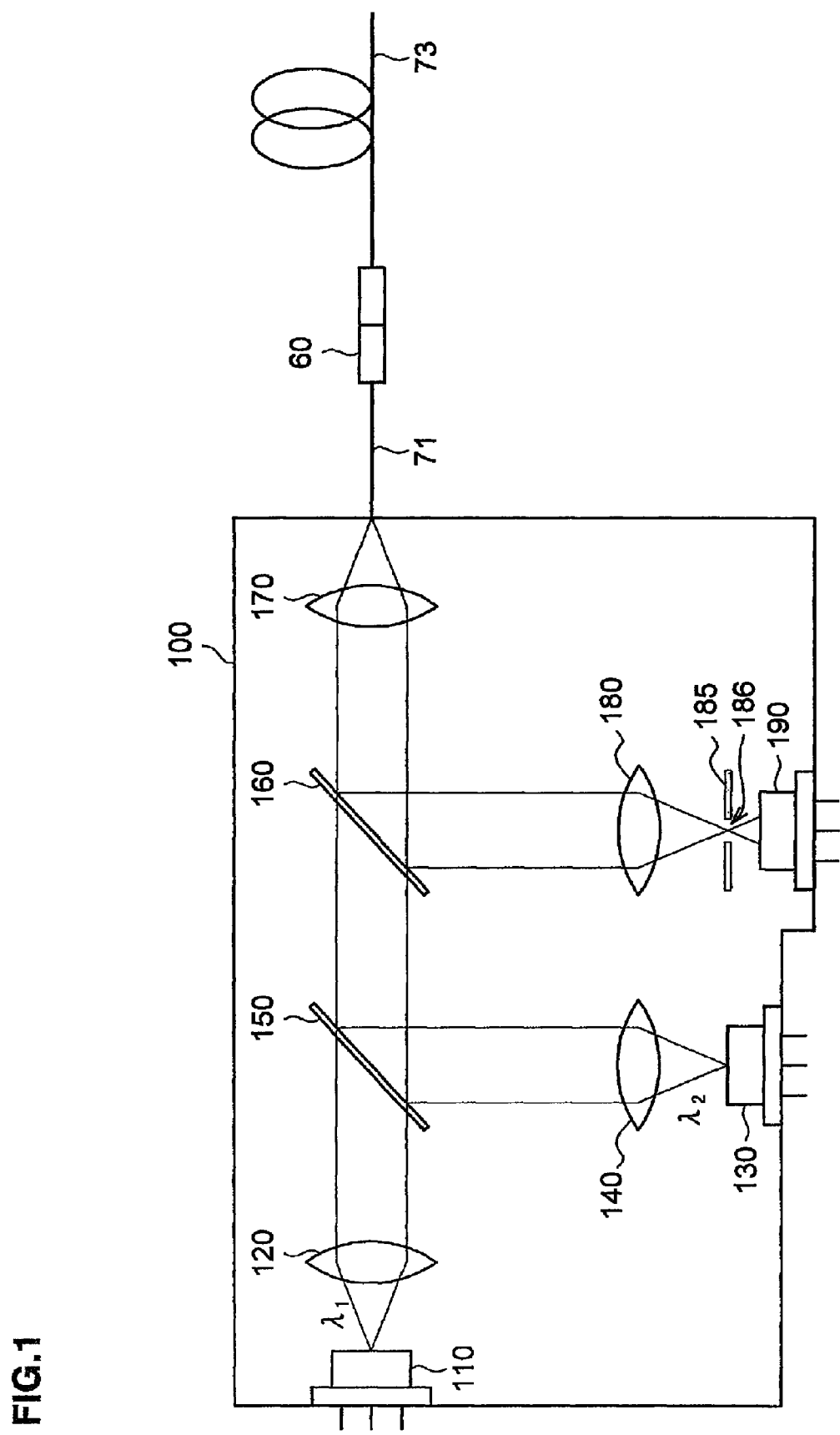
FIG. 1 is a schematic diagram showing the structure adopted in the bidirectional optical module achieved in a first embodiment of the present invention.

The following is a detailed explanation of the preferred embodiments of the present invention, given in reference to the attached drawings. It is to be noted that in the description and the drawings, the same reference numerals are assigned to components having substantially identical functions and structural features to preclude the necessity for a repeated explanation thereof.

First Embodiment

Figure 2:
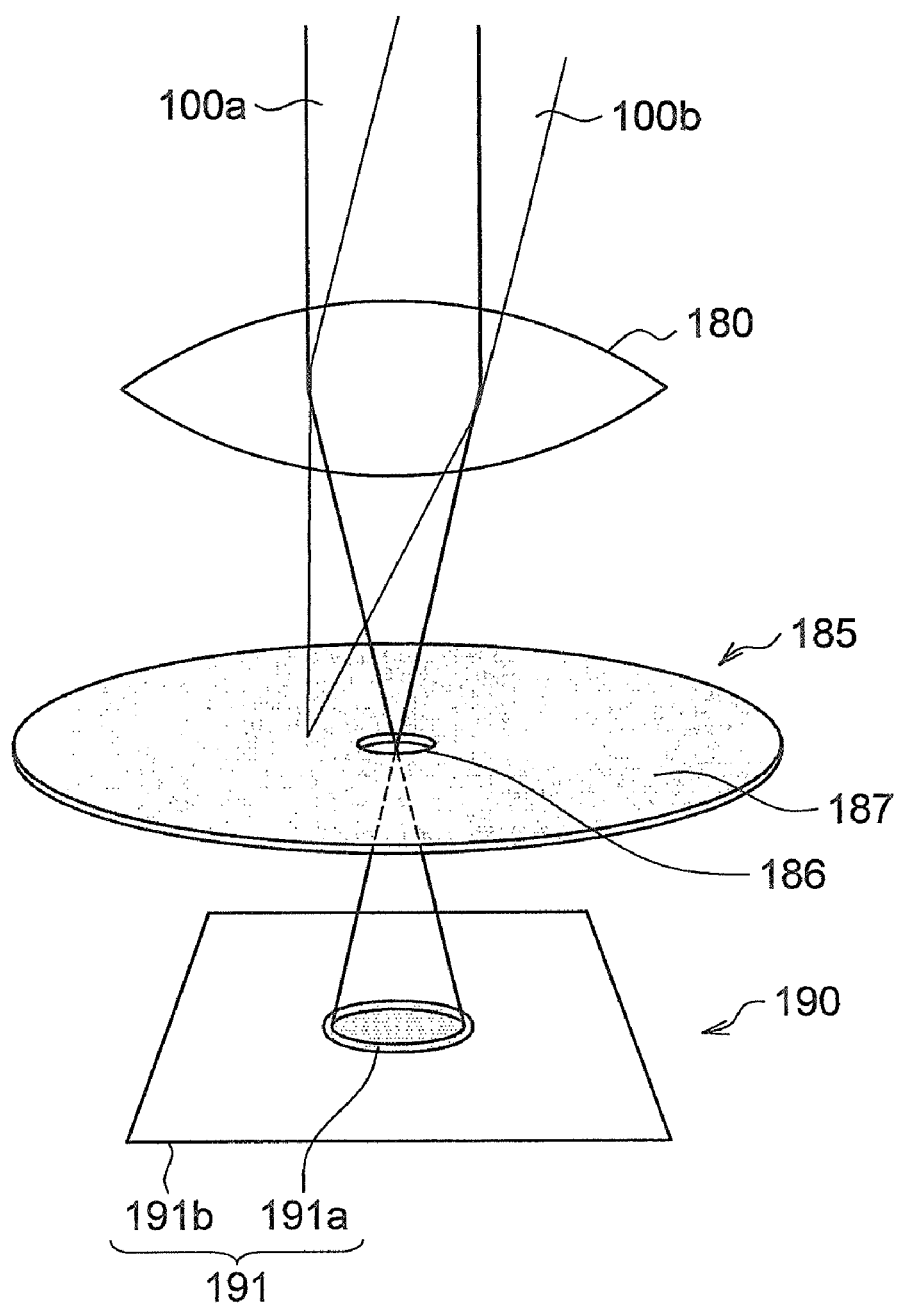
FIG. 2 illustrates how light is received at the light receiving element in the embodiment.

First, in reference to FIGS. 1 and 2, a bidirectional optical module 100 achieved in the first embodiment of the present invention is described. FIG. 1 schematic illustrates the structure adopted in the bidirectional optical module 100 achieved in the embodiment. FIG. 2 illustrates how light is received at the light receiving element.

(Structure of the Bidirectional Optical Module)

Figure 7:
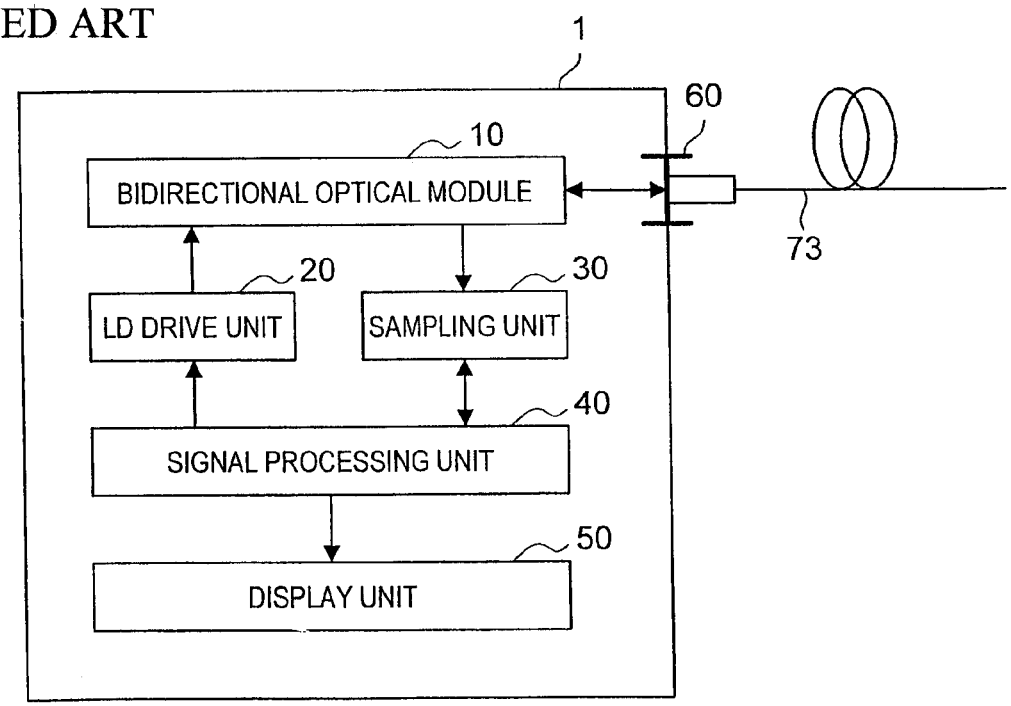
FIG. 7 is a block diagram of the structure adopted in an OTDR.
Figure 8:
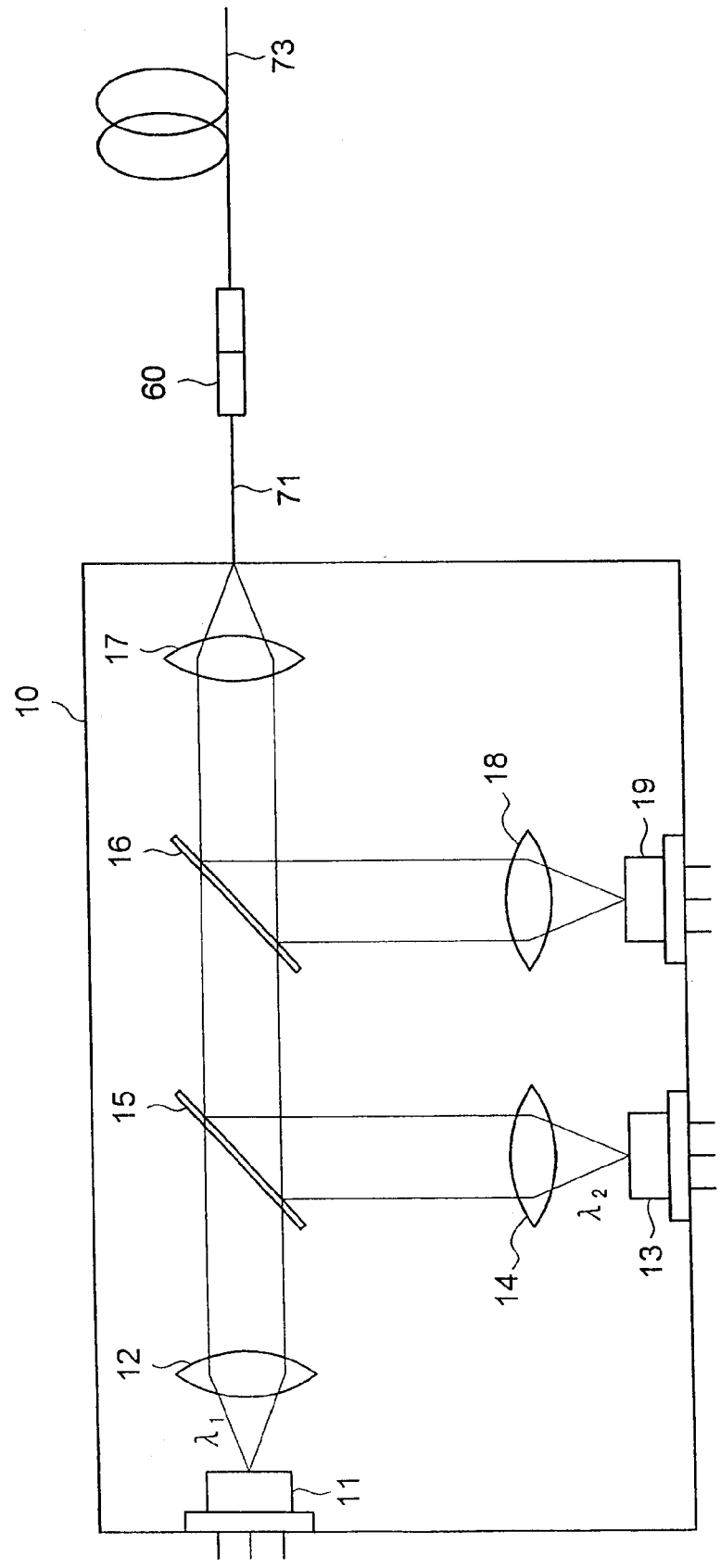
FIG. 8 is a schematic diagram showing the structure adopted in a bidirectional optical module in the related art.
Figure 9:
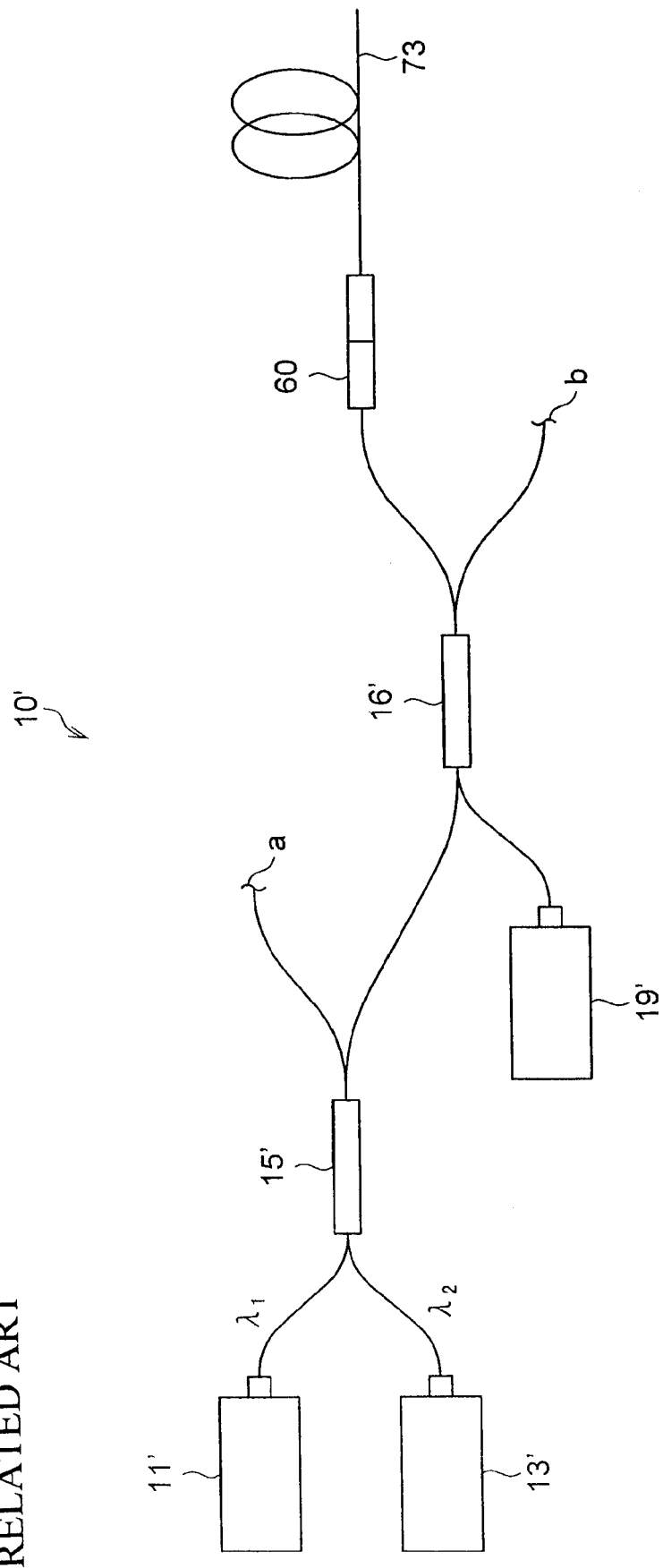
FIG. 9 is a schematic diagram showing the structure adopted in an optical fiber coupler-type bidirectional optical module in the related art.
Figure 10:
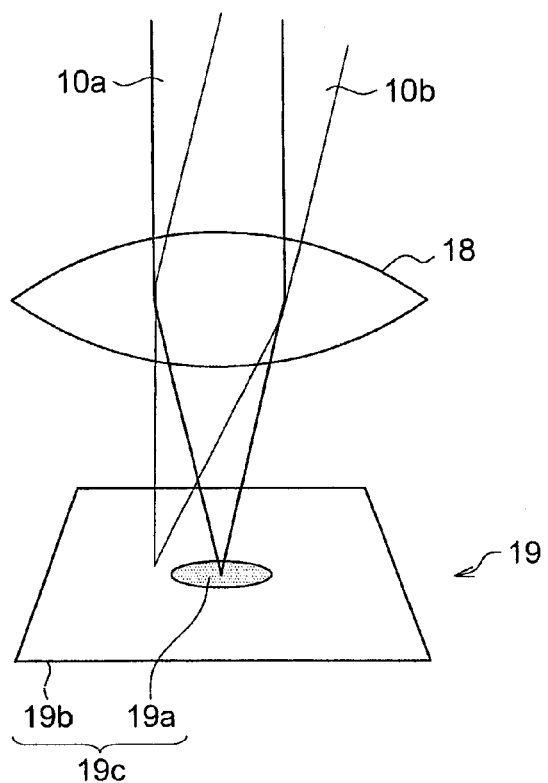
FIG. 10 illustrates how light is received at the light receiving element in the related art.
Figure 11:
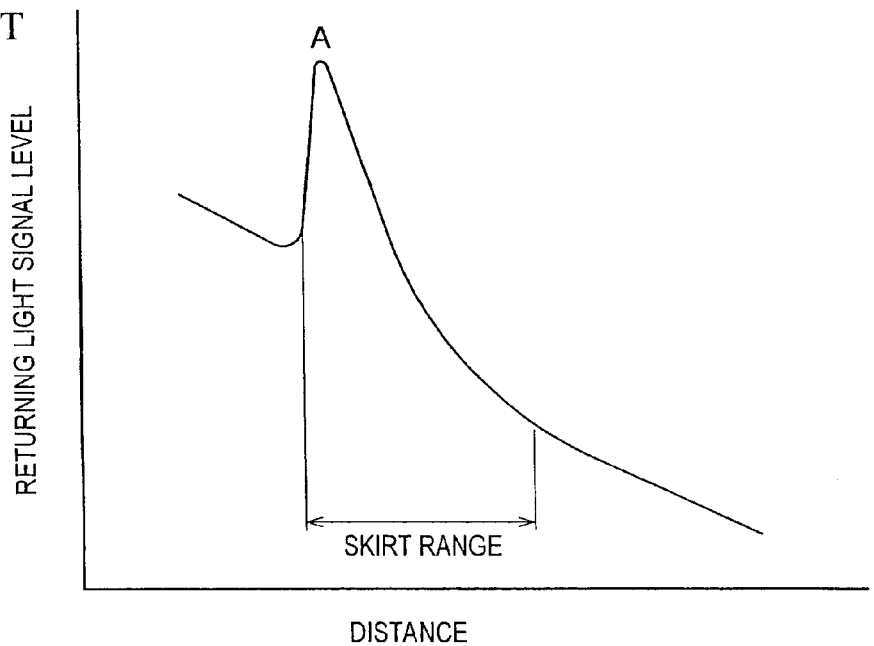
FIG. 11 presents a graph of the waveform obtained by detecting light reflected at a fracture or a connecting point with an OTDR equipped with a bidirectional optical module in the related art.

The bidirectional optical module 100 achieved in the embodiment may be included in, for instance, the OTDR 1 shown in FIG. 7. As explained earlier, the OTDR 1 is a device used in an optical communication system in which data are exchanged through signal communication, to determine through measurement the conditions of a measurement target optical fiber, e.g., whether or not a disconnection has occurred, whether or not a significant loss has occurred in the measurement target optical fiber or the like, by repeatedly inputting pulse light to the measurement target optical fiber and then measuring the level of light reflected from the measurement target optical fiber, the level of light scattered to the rear and the length of time over which light from the measurement target optical fiber is received. By equipping this OTDR 1 with the bidirectional optical module 100 achieved in the embodiment, the measurement accuracy of the OTDR 1 can be improved. In addition, the OTDR can be provided as a more compact unit compared to an OTDR equipped with the optical fiber coupler-type bidirectional optical module 10' in the related art. The following is a detailed explanation of the structure adopted in the bidirectional optical module 100 in the embodiment and the operations of the OTDR equipped with the bidirectional optical module 100.

As shown in FIG. 1, the bidirectional optical module 100 in the embodiment comprises light emitting elements 110 and 130 that emit light, lenses 120 and 140 through which light becomes parallel light, a wave integrating element 150 that integrates a plurality of light fluxes into a single light flux, lenses 170 and 180 that condense light, a light branching element 160 that branches light, a stray light shielding member 185 and a light receiving element 190 that receives light.

The light emitting element 110 and 130, which emit light to enter an optical fiber 71, may each be constituted with, for instance, a laser diode. It is to be noted that while the bidirectional optical module 100 in the embodiment includes two light emitting elements 110 and 130, the present invention is not limited to this example and the bidirectional optical module may instead include a single light emitting element or more than two light emitting elements.

The lenses 120 and 140, through which light fluxes are converted to parallel light fluxes, may each be constituted with, for instance, a collimator lens. The light emitted from the light emitting element 110 and the light emitted from the light emitting element 130 become parallel light fluxes respectively through the lens 120 and the lens 140.

The wave integrating element 150 is a filter that integrates light fluxes having entered therein via the lenses 120 and 140 and may be constituted with, for instance, a prism. The light having become integrated at the wave integrating element 150 exits the wave integrating element toward the optical fiber 71.

The light branching element 160 is an optical element that guides light returning from the optical fiber 71 toward the light receiving element 190. The light branching element 160 may be, for instance, a beam splitter constituted with a half mirror. Part of or all of the light having entered the light branching element 160 is reflected and the reflected returning light then enters the light receiving element 190.

The lenses 170 and 180, which condense light, may each be constituted with, for instance, a plano-convex lens. The lens 170 condenses the light to enter the optical fiber 71 via the wave integrating element 150, whereas the lens 180 condenses the light to enter the light receiving element 190 after becoming branched via the light branching element 160.

The stray light shielding member 185 prevents stray light 100b from reaching a light receiving surface 191 of the light receiving element 190. In particular, it shields a light receiving area with poorer frequency characteristics within the light receiving surface 191 from stray light. The stray light shielding member 185 includes a shielding portion 187 that blocks light and an opening 186 through which light to be received at the light receiving element 190 passes. The stray light shielding member 185 may be a metal plate constituted of a nickel alloy or the like, which blocks light with a pinhole formed therein to function as the opening 186 through which light is allowed to pass, as shown in FIG. 2. The pinhole, which is a through hole with, for instance, a substantially circular section, can be formed through electrical molding. For this reason, the base plate constituting the stray light shielding member 185 should be made of a material that does not transmit light and allows high precision machining. Alternatively, the stray light shielding member 185 may be a photomask prepared by first forming a light reflecting thin film at a glass substrate and then partially removing the thin film through etching so as to form the opening 186. It is desirable that the opening 186 assume a shape corresponding to the shape of a first light receiving area 191a so as to ensure that the light having passed through the opening 186 is received over the first light receiving area 191a of the light receiving element 190.

The light receiving element 190, which receives light, may be, for instance, an avalanche photodiode (hereafter referred to as an "APD"). An APD receives light by taking full advantage of the avalanche amplification effect and is capable of detecting even very weak light with a high level of sensitivity. For this reason, an APD (in particular, an APD with a small bore diameter) is ideal in OTDR applications in which weak returning light needs to be detected with a high level of distance resolution. As shown in FIG. 2, the light receiving surface 191 of the light receiving element 190 includes the first light receiving area 191a located at the center of the light receiving surface 191 and a second light receiving area 191b ranging around the first light receiving area 191a. The frequency characteristics over the first light receiving area 191a are better than those over the second light receiving area 191b. The first light receiving area 191a may assume a substantially circular shape, as shown in FIG. 2, or it may assume an oval shape or a polygonal shape instead.

The functions of the bidirectional optical module 100 in the embodiment structured as described above are now described in relation to the operations of an OTDR equipped with the bidirectional optical module 100. It is assumed that the OTDR adopts a structure identical to that shown in FIG. 7 except that it is equipped with the bidirectional module 100 achieved in the embodiment instead of the bidirectional optical module 10.

(Operations of the OTDR Equipped with the Bidirectional Optical Module)

First, the signal processing unit 40 of the OTDR 1 preselects a specific pulse width for the pulse light at the LD drive unit 20. Next, a timing signal is transmitted to the LD drive unit 20 with predetermined time intervals from a timing generation means (not shown) within the signal processing unit 40. Upon receiving the timing signal, the LD drive unit 20 engages the light emitting element 110 or the light emitting element 130 in the bidirectional optical module 100 to output pulse light in synchronization with the timing signal.

The pulse light with a wavelength λ1 emitted from the light emitting element 110 becomes parallel light through the lens 120 and the pulse light with a wavelength λ2 emitted from the light emitting element 130 becomes parallel light through the lens 140 before they enter the wave integrating element 150. The wave integrating element 150 allows the light with the wavelength λ1 having been emitted from the light emitting element 110 to be transmitted and reflects the light with the wavelength λ2 having been emitted from the light emitting element 130 so as to guide both light fluxes toward the light branching element 160. The light with the wavelength λ1 having been emitted from the light emitting element 110 and the light with the wavelength λ2 having been emitted from the light emitting element 130 are transmitted through the light branching element 160 and then entered the lens 170. The light having enter the lens 170 becomes condensed through the lens 170 and subsequently enters the optical fiber 71 as condensed light.

The light having entered the optical fiber 71 through one end thereof then enters the measurement target optical fiber 73 undergoing measurement for disconnection, loss or the like, via the measurement connector 60 connected to the optical fiber 71 at the other end thereof. Under these circumstances, the phenomenon known as Raley scattering may occur inside the measurement target optical fiber 73. In such a case, part of the scattered light advances in a direction opposite from the pulse light advancing direction and returns to the OTDR 1 as rear scattered light. In addition, the light having entered from the bidirectional optical module 100 undergoes the process of fresnel reflection at a connecting point or a fracture in the measurement target optical fiber 73 and this reflected light, too, returns to the OTDR 1.

The beams of light returning from the measurement target optical fiber 73 as described above enter the bidirectional optical module 100 via the measurement connector 60 and the optical fiber 71. The returning light becomes parallel light through the lens 170 and then is branched at the light branching element 160 so as to enter the light receiving element 190. The light having become branched at the light branching element 160 is condensed via the lens 180. The condensed light then passes through the pinhole formed at the stray light shielding member 185 before entering the first light receiving area 191a of the light receiving element 190.

In the bidirectional optical module 100 achieved in the embodiment, which includes the stray light shielding member 185 blocking entry of the returning light at the light receiving element 190, the quantity of stray light allowed to enter the light receiving element 190 after it becomes scattered inside the bidirectional optical module 100 is reduced. Namely, as shown in FIG. 2, the returning light 100a from the measurement target optical fiber 73 enters the lens 180 at a right angle and is condensed through the lens 180. It then passes through the pinhole at the stray light shielding member 185 and enters the first light receiving area 191a at the light receiving surface 191 of the light receiving element 190.

Most of the stray light 100b having been reflected and scattered inside the bidirectional optical module 100, on the other hand, enters the lens 180 with an angle of entry different from that of the returning light 100a, as it repeatedly undergoes the process of attenuation. Thus, the stray light 100b converges over the shielding portion 187 of the stray light shielding member 185. Since the shielding portion 187 of the stray light shielding member 185 is constituted of a material that does not transmit light, the stray light 100b cannot pass through the stray light shielding member 185. For this reason, it never enters the light receiving surface 191 of the light receiving element 190. In other words, since unnecessary light is not received at the light receiving element 190, the measurement accuracy of the OTDR is not compromised.

It is desirable that the lens 180 be disposed at a position at which it condenses the returning light 100a onto the pinhole. By disposing the lens 180 at such a position, the quantity of returning light 100a that is blocked off at the pinhole can be reduced.

In addition, it is desirable that the area of the opening 186 at the stray light shielding member 185 be smaller than the areal range of the first light receiving area 191a of the light receiving element 190, so as to ensure that the light having passed through the opening 186 can be readily received at the first light receiving area 191a with the superior frequency characteristics, which ultimately lead to an improvement in the measurement accuracy of the OTDR.

The light receiving element 190, having received the returning light, converts the returning light to an electrical signal (photocurrent) corresponding to the level of the power of the returning light and outputs the electrical signal to the sampling unit 30. The sampling unit 30, in turn, first converts the photocurrent from the light receiving element 190 to a voltage via its internal IV conversion circuit (not shown) and then amplifies the electrical signal through a multistage internal amplifier (not shown). In addition, the sampling unit 30 engages its A/D conversion circuit (not shown) to convert the amplified analog electrical signal to a digital signal by using the timing signal provided from the signal processing unit 40 for time reference and then outputs the resulting digital electrical signal to the signal processing unit 40.

Subsequently, based upon the timing with which the timing signal has been output and the digital signal having been received from the sampling unit 30, the signal processing unit 40 calculates the length of time having elapsed after the pulse light was emitted by the light emitting elements 110 and 130 until the returning light was received at the light receiving element 190. In addition, the signal processing unit 40 determines the measurement distance to the measurement target optical fiber 73 and the light signal level of the returning light and engages at the display unit 50 the relationship between the distance and the returning light signal level as the measurement results. It is to be noted that since the light signal level of the returning light is extremely low, pulse light should be repeatedly output to the measurement target optical fiber and measurement values resulting from a plurality of measurements should be averaged at the signal processing unit 40 so as to reduce the noise.

Figure 3:
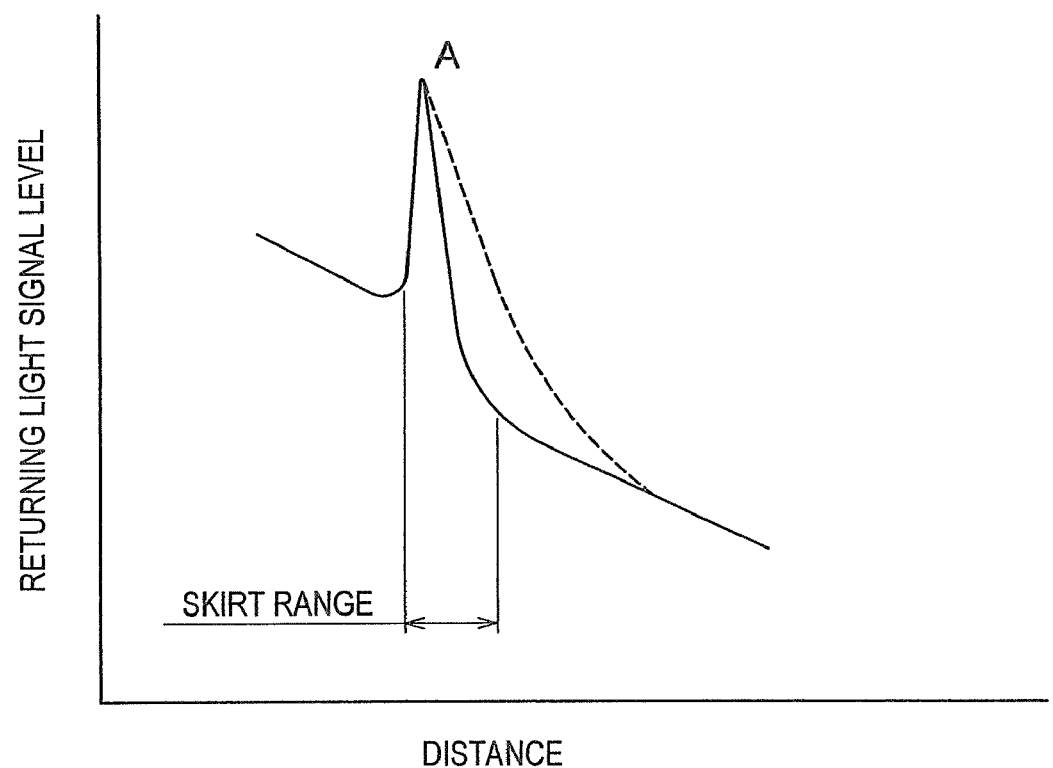
FIG. 3 presents a graph of the waveform obtained by detecting light reflected at a fracture or a connecting point with an OTDR equipped with the bidirectional optical module achieved in the embodiment.

FIG. 3 shows the waveform obtained by measuring a fracture or a connecting point in the measurement target optical fiber 73 with the OTDR equipped with the bidirectional optical module 100 achieved in the embodiment. In FIG. 3, the solid line indicates the measurement results obtained by using the OTDR equipped with the bidirectional optical module 100 in the embodiment and the dotted line indicates the measurement results obtained by using an OTDR equipped with the bidirectional optical module 10 in the related art.

Upon detecting light reflected from a fracture or a connecting point in the measurement target optical fiber 73, the OTDR equipped with the bidirectional optical module 100 achieved in the embodiment registers a waveform with a protrusion (fresnel reflection waveform) as indicated by the solid line in FIG. 3, similar to that registered in an OTDR in the related art. However, the waveform (solid line) registered in the OTDR equipped with the bidirectional optical module 100 in the embodiment has a smaller skirt range than that in the waveform (dotted line) registered in the OTDR in the related art, since the bidirectional optical module 100 in the embodiment includes the stray light shielding member 185 with the shielding portion 187 blocking the stray light 100b and thus reduces the quantity of stray light 100b reaching the second light receiving area 191b of the light receiving element 190. In other words, even when light is reflected at two reflecting points close to each other, the protruding points of the rear reflection wave does not overlap the skirt range of the front reflection wave and thus, the protruding point does not become concealed in the OTDR equipped with the bidirectional optical module 100 in the embodiment. As a result, the OTDR assures a higher level of measurement accuracy compared to the OTDR in the related art.

As explained above in the description of the bidirectional optical module 100 achieved in the first embodiment and the operations of the OTDR equipped with this bidirectional optical module, in order to prevent the stray light 100b from entering the light receiving element 190, the stray light shielding member 185 is disposed between the light branching element 160 and the light receiving element 190 in the bidirectional optical module 100. Thus, the light 100a entering the light receiving element 190 first passes through the opening 186 at the stray light shielding member 185 and then reaches the first light receiving area 191a of the light receiving element 190, whereas the stray light 100b is blocked by the shielding portion 187 of the stray light shielding member 185. Namely, since the stray light 100b is blocked by the stray light shielding member 185 and thus is not allowed to reach the second light receiving area 191b with poorer frequency characteristics compared to the first light receiving area 191a, the skirt range is reduced and the measurement accuracy of the bidirectional optical module 100 is improved. In addition, such a bidirectional optical module 100 can be provided as a more compact unit compared to an optical fiber coupler-type bidirectional optical module.

It is to be noted that the stray light shielding member 185 in the bidirectional optical module 100 in the first embodiment may be disposed in close proximity to or in contact with the light receiving element 190. In such a case, the opening 186 at the stray light shielding member 185 and the first light receiving area 191a of the light receiving element 190 should assume shapes substantially identical to each other and areal sizes substantially equal to each other. For instance, the stray light shielding member 185 and the light receiving element 190 may be formed as an integrated unit by laminating a reflecting film such as a metal film or a dielectric multilayer film, which is to function as the stray light shielding member 185, over the surface of the light receiving surface 191 so that the reflecting film covers the entire second light receiving area 191b or by disposing a reflecting member constituted of a dielectric material in contact with the second light receiving area 191b. Such a structure leaves the second light receiving area 191b of the light receiving surface 191 at the light receiving element 190 covered with the stray light shielding member 185, ensuring that the stray light 100b is not received over the second light receiving area 191b.

Second Embodiment

Figure 4:
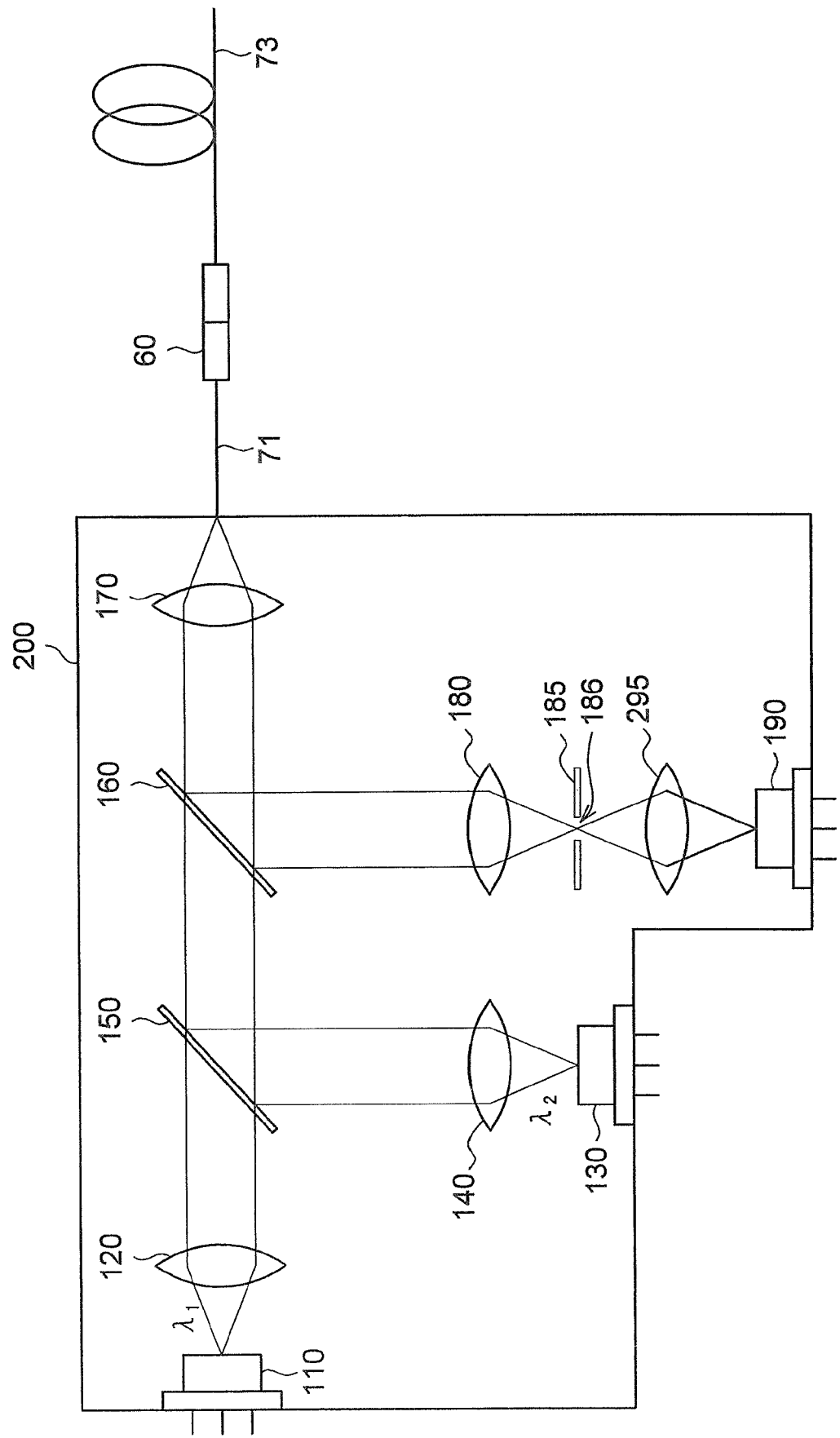
FIG. 4 is a schematic diagram showing the structure adopted in the bidirectional optical module achieved in a second embodiment of the present invention.
Figure 5:
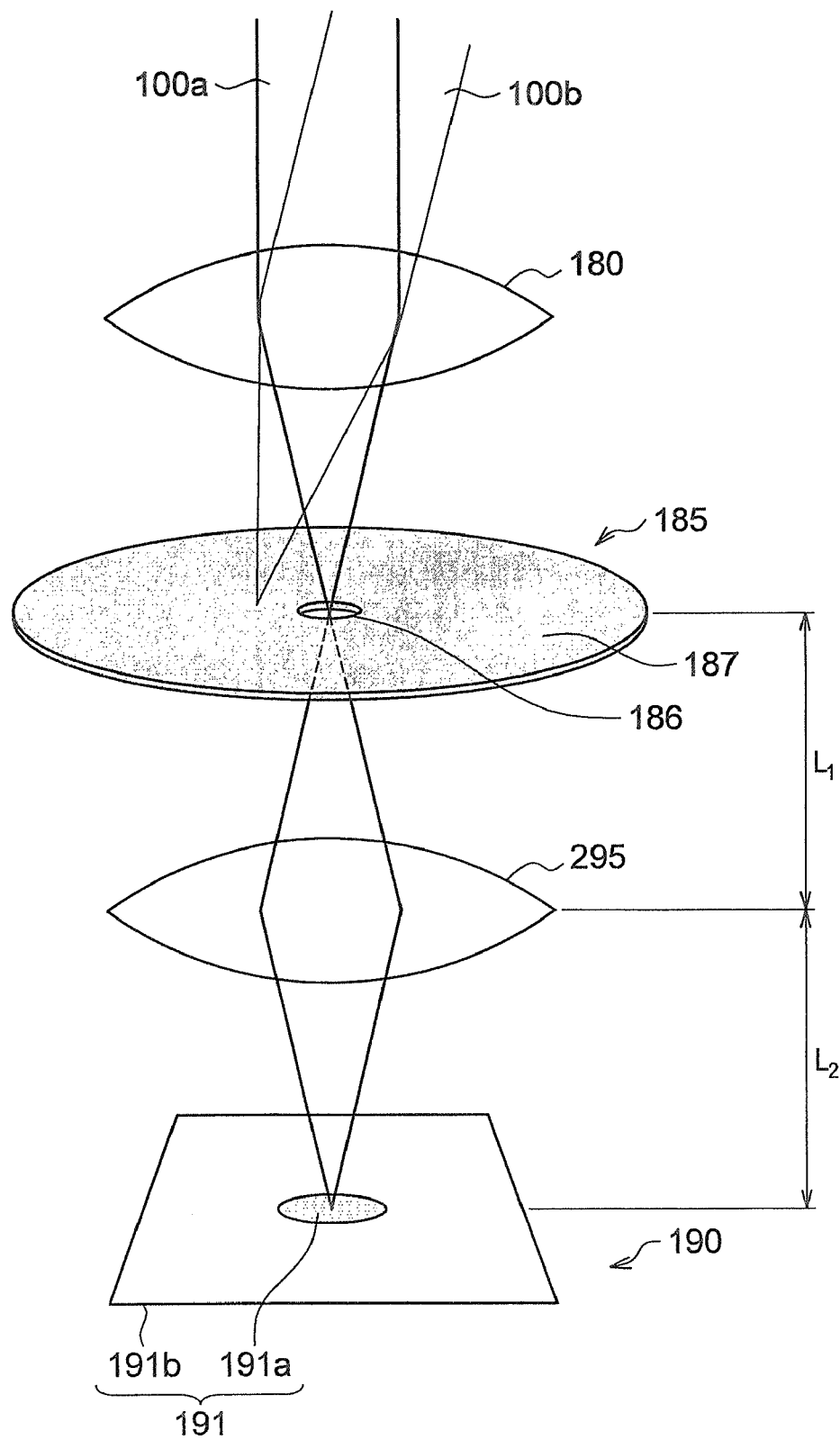
FIG. 5 illustrates how light is received at the light receiving element in the embodiment.

Next, in reference to FIGS. 4 and 5, the bidirectional optical module achieved in the second embodiment of the present invention is described. The bidirectional optical module 200 in the second embodiment differs from the bidirectional optical module 100 in the first embodiment in that it includes a lens 295 disposed between the stray light shielding member 185 and the light receiving element 190. It is to be noted that FIG. 4 schematically shows the structure adopted in the bidirectional optical module 200 achieved in the second embodiment. FIG. 5 illustrates how light is received at the light receiving element 190 in the embodiment.

As shown in FIG. 4, the bidirectional optical module 200 in the embodiment comprises light emitting elements 110 and 130 that emit light, lenses 120 and 140 through which light becomes parallel light, a wave integrating element 150 that integrates a plurality of light fluxes into a single light flux, lenses 170, 180 and 295 that condense light, a light branching element 160 that branches light, a stray light shielding member 185 and a light receiving element 190 that receives light.

The lens 295 included in the bidirectional optical module condenses the light 100a having passed through the opening 186 at the stray light shielding member 185 onto the first light receiving area 191a at the light receiving element 190. The opening 186 at the stray light shielding member 185 assumes a small diameter so that the quantity of stray light 100b, with an angle of inclination different from the angle of incidence of the returning light 110a, which passes through the opening, is minimized. Accordingly, it is desirable that a converging point to which the returning light 100a is condensed through the lens 180 be set substantially at the opening 186 so as to minimize the loss of the returning light 100a as it passes through the opening 186. However, having converged, the light then gradually diverges as it advances. This issue is addressed by condensing the light 100a having passed through the stray light shielding member 185 with the lens 295 onto the first light receiving area 191a of the light receiving element 190 as shown in FIG. 5, so as to deliver the returning light 100a to the first light receiving area 191a with a high level of reliability and ultimately improve the measurement accuracy of the bidirectional optical module 200.

Assuming that the opening 186 at the stray light shielding member 185 has a substantially circular shape and that the first light receiving area 191a at the light receiving element 190, too, assumes a substantially circular shape, the image magnifying power m of the lens 295, the diameter d1 of the opening 186 in the stray light shielding member 185 and the diameter d2 of the first light receiving area 191a at the light receiving element 190 have a relationship expressed as in (1) below in the bidirectional optical module 100.

$$d_1 < d_2/m \quad (1)$$

The image magnifying power m of the lens 295 can be expressed as in (2) below.

$$m = L_2/L_1 \quad (2)$$

It is to be noted that $L_1$ and $L_2$ in the expression above respectively represent the distance from the opening 186 in the stray light shielding member 185 to the lens 295 and the distance from the lens 295 to the light receiving surface 191.

Expression (1) indicates that in conjunction with a lens 295 with its magnifying power m at 1, the opening 186 at the stray light shielding member 185 should be formed so that its diameter d1 is equal to or less than the diameter d2 of the first light receiving area 191a at the light receiving element 190.

In addition, it is desirable that the lens 295 be a low aberration lens. Under normal circumstances, a performance error (aberration) such as a converging point offset, occurs in a lens. By utilizing a low aberration lens to constitute the lens 295 in the bidirectional optical module 200 in the embodiment, it can be ensured that the light 100a is not allowed to be condensed onto the second light receiving area 191b off the first light receiving area 191a, at the light receiving element 190.

The OTDR equipped with the bidirectional optical module 200 achieved in the embodiment, too, registers a waveform (fresnel reflection waveform) with a protruding point as indicated by the solid line in FIG. 3, upon detecting light reflected at a fracture or a connecting point in the measurement target optical fiber 73, as does the OTDR in the first embodiment. In addition, with the condenser lens 295 disposed between the stray light shielding member 185 and the light receiving element 190, the returning light 100a can be delivered onto the first light receiving area 191a even more reliably in the bidirectional optical module 200 in the embodiment. As a result, an skirt range even smaller than that of the waveform indicated by the solid line in FIG. 3 is achieved. The OTDR equipped with the bidirectional optical module 200 in the embodiment assures a higher level of measurement accuracy compared to OTDRs in the related art.

It is to be noted that the converging point at which the returning light 100a is condensed through the lens 295 does not need to be set exactly on the light receiving surface 191 of the light receiving element 190, as long as the returning light is condensed until its beam diameter becomes small enough to be contained within the first light receiving area 191a with the superior frequency characteristics.

(Test Results)

Figure 6:
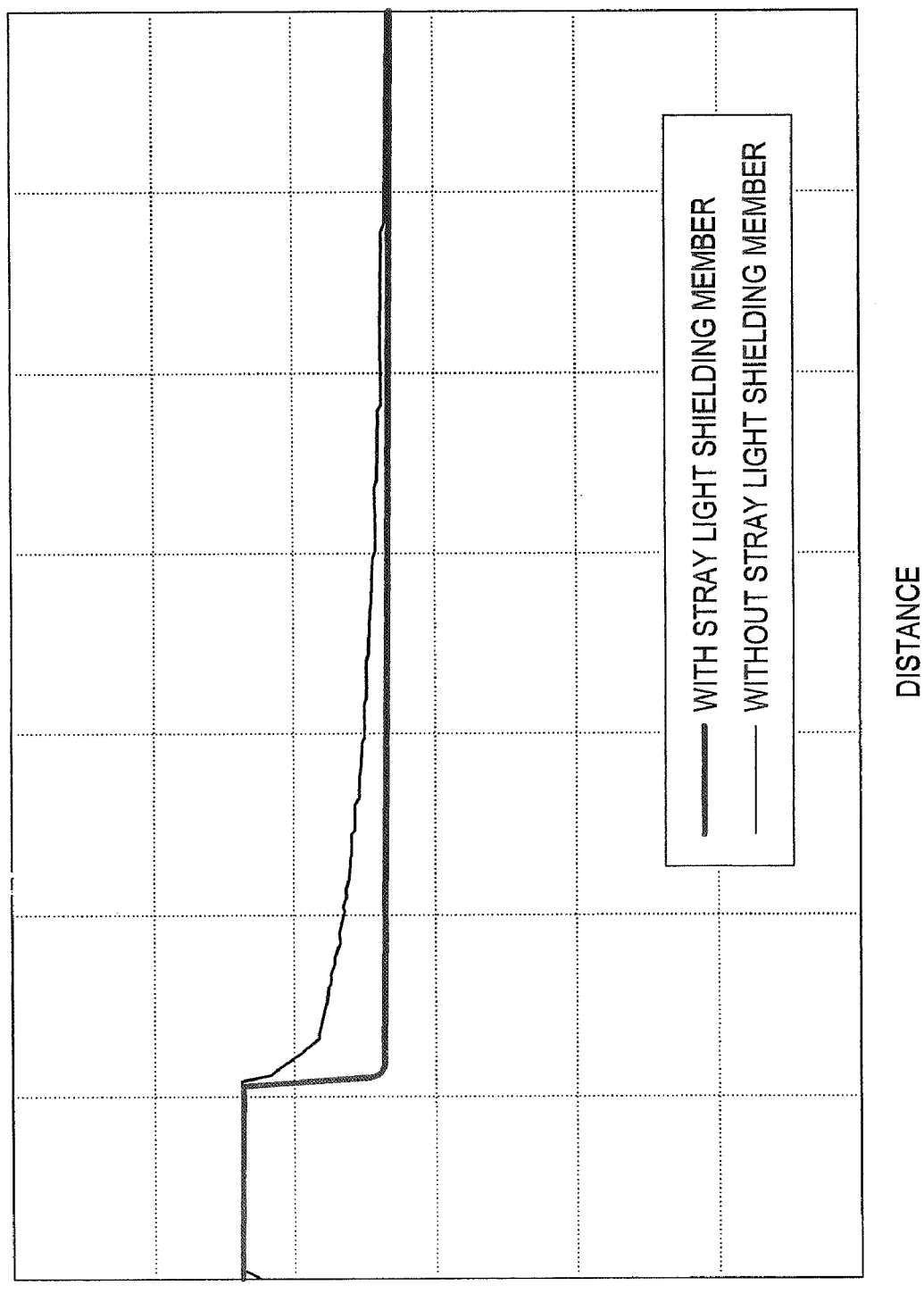
FIG. 6 presents graphs of the waveforms obtained by detecting light reflected at a fracture or a connecting point with the bidirectional optical module achieved in the embodiment with/without a stray light shielding member disposed therein.

FIG. 6 presents measurement results obtained by measuring fractures of measurement target optical fibers 73 with OTDRs each equipped with the bidirectional optical module 200 achieved in the embodiment. In the tests, fractures in the measurement target optical fibers 73 located over a distance range of approximately 10 km were measured by outputting pulse light with a wavelength of 1.31 μm and a pulse width of 1 μsec from the light emitting elements of the bidirectional optical module 200. In addition, the tests were conducted by setting the sampling resolution at 20 cm.

In the tests, the fractures were measured by using a bidirectional optical module 200 such as that shown in FIG. 4 equipped with the stray light shielding member 185 (indicated by the solid line) and a similar bidirectional optical module 200 that did not include the stray light shielding member 185 (indicated by the dotted line). FIG. 6 presents the measurement results. As FIG. 6 indicates, the tester with the bidirectional optical module that did not include the stray light shielding member 185 registered a waveform that fell gently after the signal level increased upon the detection of the fracture, resulting in a significant skirt range. In contrast, the tester equipped with the bidirectional optical module 200 that included the stray light shielding member 185 registered a waveform with the signal level falling acutely after detecting the fracture, resulting in a smaller skirt range compared to that detected with the tester without the stray light shielding member 185.

The difference described above is attributed to the stray light 100b delivered to the second light receiving area 191d to ultimately enter the light receiving element 190 in the bidirectional optical module without the stray light shielding member 185. In the bidirectional optical module 200 equipped with the stray light shielding member 185, the stray light 100b was blocked at the shielding portion 187 of the stray light shielding member 185 but the returning light 100a was allowed to pass through the opening 186 at the stray light shielding member 185 to reach the first light receiving area 191a. Namely, it is assumed that the smaller skirt range was achieved by using the stray light shielding member as the returning light was detected with a high level of reliability at the first light receiving area 191a with the superior frequency characteristics.

The structure adopted in the bidirectional optical module 200 achieved in the second embodiment has been explained so far. In order to prevent the stray light 100b from entering the second light receiving area 191b at the light receiving element 190, the stray light shielding member 185 is disposed between the light branching element 160 and the light receiving element 190 in the bidirectional optical module 200 achieved in the second embodiment. Thus, the stray light 100b is blocked by the stray light shielding member 185 before it is delivered to the second light receiving area 191b with poorer frequency characteristics compared to the first light receiving area 191a. In addition, the bidirectional optical module 200 in the embodiment includes the lens 295 disposed between the stray light shielding member 185 at the light receiving element 190, which condenses light having passed through the opening 186 and the stray light shielding member 185 onto the first light receiving area 191a at the light receiving element 190. This structure prevents the light having passed through the opening 186 from becoming condensed onto the second light receiving area 191b off the first light receiving area 191a and thus improves the measurement accuracy of the bidirectional optical module 200. Furthermore, the bidirectional optical module 200 can be provided as a more compact unit compared to an optical fiber coupler-type bidirectional optical module.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

For instance, while the OTDR 1 in the embodiments includes the display unit 50, the present invention is not limited to this example and it may be adopted in conjunction with, for instance, a separate display device connected to the OTDR 1.

In addition, while the lens 180 is disposed between the light branching element 160 and the stray light shielding member 185 in the bidirectional optical modules in the embodiments, the present invention is not limited to this example and may be adopted in a structure that does not include the lens 180.

While the bidirectional optical module according to the present invention is utilized in OTDRs engaged in detection of a disconnection or the like occurring in optical fibers in the embodiments described above, the bidirectional optical module according to the present invention may also be adopted in bidirectional optical communication networks such as a fiber to the home (FTTH) network and a local area network (LAN).

Moreover, while the light receiving element is constituted with an APD in the embodiments described above, the present invention may also be adopted in conjunction with a light receiving element constituted with a pin photodiode, a silicon photodiode in configurations in which light emitted from one module is received at another module and light emitted from the other module is received at the first module, such as a transmission/reception module, since the level of the signal light will not be excessively weak in such configurations.

What is claimed is:

1. A bidirectional optical module comprising:
    a light emitting element that emits light to enter an optical fiber;
    a light receiving element that receives light having exited the optical fiber; and
    a light branching optical element that is partially transmissive and partially reflective and guides the light having exited said optical fiber to said light receiving element as parallel light via open space; and
    a stray light shielding member having an opening formed therein, through which the light to enter said light receiving element passes, wherein the stray light shielding member is disposed between said light branching optical element and said light receiving element substantially parallel to a light receiving surface of the light receiving element.

2. The bidirectional optical module according to claim 1, further comprising:
a light condensing element that condenses the light having become branched via said light branching optical element onto said opening at said stray light shielding member, wherein the light condensing element is disposed between said light branching optical element and said stray light shielding member and a focus of the condensed light is the same point as said opening.

3. The bidirectional optical module according to claim 1, wherein:
said light receiving element detects loss characteristics of said optical fiber by receiving the light returning from said optical fiber having received the light originating from said light emitting element.

4. The bidirectional optical module according to claim 1, wherein:
said light receiving element detects information exchanged with an external device through communication by receiving the light from said optical fiber having received light originating from said external device.

5. The bidirectional optical module according to claim 1, wherein the light emitting element comprises a plurality of light emitting elements.

6. The bidirectional optical module according to claim 1, wherein:
the light receiving surface of said light receiving element includes a first light receiving area and a second light receiving area with lower frequency characteristics compared to said first light receiving area; and
said stray light shielding member is disposed to cover said second light receiving area.

7. The bidirectional optical module according to claim 1, wherein the stray light shielding member includes a shielding portion which surrounds the opening.

8. The bidirectional optical module according to claim 1, wherein:
the light receiving surface of said light receiving element includes a first light receiving area and a second light receiving area with lower frequency characteristics compared to said first light receiving area; and
said bidirectional optical module further includes:
a first light condensing element that condenses the light having passed through said opening onto said first light receiving area, wherein the first light condensing element is disposed between said stray light shielding member and said light receiving element.

9. The bidirectional optical module according to claim 6, wherein:
said stray light shielding member is formed as an integrated part of said light receiving element.

10. The bidirectional optical module according to claim 7, wherein the light receiving surface includes a first light receiving area and a second light receiving area with lower frequency characteristics compared to the first light receiving area and the opening is disposed in a central portion of the shielding portion to correspond to the first light receiving area.

11. The bidirectional optical module according to claim 8, wherein:
the area of said opening is equal to or less than an areal range of said first light receiving area at said light receiving element.

12. The bidirectional optical module according to claim 8, further comprising:
a second light condensing element, disposed between the light branching optical element and the stray light shielding member, which condenses the light having become branched onto the opening.

13. The bidirectional optical module according to claim 8, wherein the first condensing element is disposed at a first distance L1 from the opening of the stray light shielding member and at a second distance L2 from the light receiving element, which second distance is equal to a product of the first distance and a magnification power of the first condensing element.

14. The bidirectional optical module according to claim 8, wherein the opening is a substantially circular opening with a first diameter d1 and the first light receiving area is a substantially circular area with a second diameter d2 equal to a product of the first diameter and a magnification power of the first condensing element.

15. An optical time domain reflectometer that tests loss characteristics of an optical fiber, comprising:
a bidirectional optical module that emits light toward said optical fiber and receives light returning from the optical fiber;
a bidirectional optical module drive unit that drives said bidirectional optical module to emit light with predetermined timing;
an electrical signal conversion unit that converts light having entered said bidirectional optical module to an electrical signal; and
a signal processing unit that determines through calculation the loss characteristics of said optical fiber based upon said electrical signal resulting from the conversion executed by said electrical signal conversion unit, wherein:
said bidirectional optical module includes:
a light emitting element that emits light to enter said optical fiber;
a light receiving element that receives light having exited the optical fiber;
a light branching optical element that is partially transmissive and partially reflective and guides light having exited said optical fiber to said light receiving element as parallel light via open space; and
a stray light shielding member having an opening formed therein, through which the light to enter said light receiving element passes, wherein the stray light shielding member is disposed between said light branching optical element and said light receiving element substantially parallel to a light receiving surface of the light receiving element.

16. The reflectometer according to claim 15, wherein the light emitting element comprises a plurality of light emitting elements.

17. A bidirectional optical module comprising:
a light emitting element that emits light to enter an optical fiber;
a light receiving element that receives light having exited the optical fiber;
a light branching optical element that is partially transmissive and partially reflective and guides the light having exited said optical fiber to said light receiving element as parallel light via open space;

a stray light shielding member having an opening formed therein, through which the light to enter said light receiving element passes, wherein the stray light shielding member is disposed between said light branching optical element and said light receiving element; and a light condensing element that condenses the light having become branched via said light branching optical element onto said opening at said stray light shielding member, wherein the light condensing element is disposed between said light branching optical element and said stray light shielding member, and a focus of the condensed light is the same point as said opening.

18. An optical time domain reflectometer that tests loss characteristics of an optical fiber, comprising:

a bidirectional optical module that emits light toward said optical fiber and receives light returning from the optical fiber;

a bidirectional optical module drive unit that drives said bidirectional optical module to emit light with predetermined timing;

an electrical signal conversion unit that converts light having entered said bidirectional optical module to an electrical signal; and a signal processing unit that determines through calculation the loss characteristics of said optical fiber based upon said electrical signal resulting from the conversion executed by said electrical signal conversion unit, wherein:

said bidirectional optical module includes:

a light emitting element that emits light to enter said optical fiber;

a light receiving element that receives light having exited the optical fiber;

a light branching optical element that is partially transmissive and partially reflective and guides the light having exited said optical fiber to said light receiving element as parallel light via open space;

a stray light shielding member having an opening formed therein, through which the light to enter said light receiving element passes, wherein the stray light shielding member is disposed between said light branching optical element and said light receiving element; and a light condensing element that condenses the light having become branched via said light branching optical element onto said opening at said stray light shielding member, wherein the light condensing element is disposed between said light branching optical element and said stray light shielding member, and a focus of the condensed light is the same point as said opening.

* * * * *